United States Patent Office 3,732,312
Patented May 8, 1973

---

3,732,312
PROCESS FOR PREPARING ALIPHATIC AMINES
Zdzislaw J. Dudzinski, Clifton, N.J., assignor to Millmaster Onyx Corporation, New York, N.Y.
No Drawing. Continuation-in-part of application Ser. No. 411, Jan. 2, 1970, which is a division of application Ser. No. 636,664, May 8, 1967. This application Nov. 10, 1970, Ser. No. 88,520
The portion of the term of the patent subsequent to Apr. 1, 1986, has been disclaimed
Int. Cl. C07c 85/04
U.S. Cl. 260—584 R                            5 Claims

ABSTRACT OF THE DISCLOSURE

Tertiary aliphatic amines are prepared by the reaction of 1-chloroalkanes or 1-bromoalkanes with secondary alkylolamines in a solventless environment at a temperature at least as high as room temperature, but preferably ranging from about 100° to 170° C., and at ambient or slightly above ambient pressure.

---

This is a continuation-in-part of application Ser. No. 411, now abandoned, filed Jan. 2, 1970, as a division of application Ser. No. 636,664, filed May 8, 1967, now U.S. Pat. No. 3,548,001.

This invention relates to the preparation of aliphatic amines, and it particularly relates to the preparation of tertiary amines by the reaction of either 1-chloroalkanes or 1-bromoalkanes and secondary alkylolamines in the absence of a solvent.

In many instances, especially when there is any great excess of the halogenated hydrocarbon, there is a secondary reaction with at least some of the produced tertiary amine to form quaternary ammonium compounds. When the reaction is conducted in a solvent medium, such as heretofore generally used, these quaternaries, even when present in very small amounts, had a deleterious effect on the reaction, causing emulsification when the free amine was separated from the liquid medium, and causing pyrolysis during distillation.

In accordance with the present invention, the reaction is conducted in a solventless environment at a temperature of between about room temperature and about 180° C., preferably between about 100° and 170° C. for a period of between about 4 to 14 hours, preferably about 8 to 12 hours. The pressure maintained during the reaction may range from about ambient for high boiling reactants to between about 285 and 350 p.s.i. for low boiling or gaseous reactants. The following examples are illustrative of the present invention, without any intent, however, to limit the scope of the invention except as claimed.

EXAMPLE 1

A round-bottom three-necked glass flask, fitted with an agitator and gas inlet and outlet tubes and with a reflux condenser before the gas outlet tube, was charged with 260 grams (or 1.1 mol) of n-lauryl chloride and 462 grams (or 4.4 mol) of diethanolamine, and the mixture was heated, in the absence of alkali-to 160°–170° C. for 12 hours at ambient pressure, maintaining a nitrogen atmosphere in the flask until the reaction mixture was cooled. Ionic chloride titration indicated 98% completion of reaction.

The excess diethanolamine was stripped off by heating in vacuo. The cooled residue was treated with an excess of aqueous caustic soda to liberate lauryl diethanolamine from its hydrochloride salt. After separating the brine, the amine was washed three times with a 10% aqueous sodium chloride solution, and the amine layer was then dried in a vacuum oven, to yield 305 grams of 94% pure lauryl diethanolamine.

EXAMPLE 2

In the same manner as in Example 1, diethanolamine was reacted with n-myristyl, n-cetyl and n-stearyl chlorides respectively to yield the corresponding alkyl diethanolamines in comparable yields and purities.

EXAMPLE 3

In an apparatus as in Example 1, 1004 grams (or 4.0 mols) of n-dodecyl bromide was reacted similarly with 1260 grams (or 12.0 mols) of diethanolamine at 120°–130° C. for eight hours at ambient pressure, under nitrogen.

The stripped crude product was washed with 10% aqueous salt solution as above; a little isopropanol was added to facilitate separation. The dodecyl diethanolamine was vacuum oven dried, and yielded 1050 grams at 98% purity.

EXAMPLE 4

The homologous alkyl bromides of Example 2 were reacted similarly, with comparable yields and purities.

EXAMPLE 5

In the same apparatus as in Example 1, and in the same manner, 1,004 grams (or 4.0 mols) of n-dodecyl bromide and 1092 grams (or 12.0 mols) of methylethanolamine were reacted for 9 hours at 110°–130° C. under nitrogen, at atmospheric pressure. No alkali was present.

The excess of methylethanolamine was stripped off by heating under reduced pressure. Aqueous sodium hydroxide in excess was added to liberate the amine from its hydrobromide salt, and the brine was removed. The residue was washed with 10% aqueous sodium chloride solution and the separated organic layer was vacuum dried and then filtered.

The product, dodecyl methylethanolamine, was obtained in 1022 grams yield at 97% purity.

The homologous alkyl chlorides and bromides of the previous examples may be reacted in the same manner.

In addition to the above-disclosed chlorides and bromides, other higher alkyl halides, such as decyl, stearyl, etc., may be used. Such homologous halides are used in the identical manner as disclosed in the above examples and react in the same manner to produce the homologous tertiary amines.

It is also within the scope of the present invention to substitute other secondary alkylolamines for the diethanolamine disclosed above; as, for example, di-isopropanolamine, etc.

The invention claimed is:

1. A method of making a tertiary amine which comprises reacting a 1-haloalkane having 12 to 18 carbon atoms with a greater than stoichiometric amount of an alkylolamine, in the absence of a solvent, and in the absence of an alkali at a temperature which is at least as high as room temperature, for a period of time sufficient to cause the reaction to go to completion.

2. The method of claim 1 wherein the alkylolamine is a member of the group consisting of diethanolamine and methylethanolamine.

3. The method of claim 1 wherein the temperature is between about room temperature to about 180° C.

4. The method of claim 1 wherein the period of the reaction is between about 4 to about 14 hours.

5. The method of claim 1 wherein the pressure is between about ambient to about 350 p.s.i.

References Cited
UNITED STATES PATENTS

| | | | |
|---|---|---|---|
| 3,401,203 | 9/1968 | Kraiman et al. | 260—583 R |
| 3,471,561 | 10/1968 | Dadekian et al. | 260—583 R |
| 3,436,420 | 4/1969 | Dudzinski | 260—583 R |
| 3,497,555 | 2/1970 | Dudzinski | 260—583 R |

LEWIS GOTTS, Primary Examiner

R. L. RAYMOND, Assistant Examiner

U.S. Cl. X.R.

260—583 R, 585 A